W. C. BUHLES.
CLOSING MACHINE.
APPLICATION FILED MAR. 10, 1915.
1,227,244.
Patented May 22, 1917.
7 SHEETS—SHEET 5.
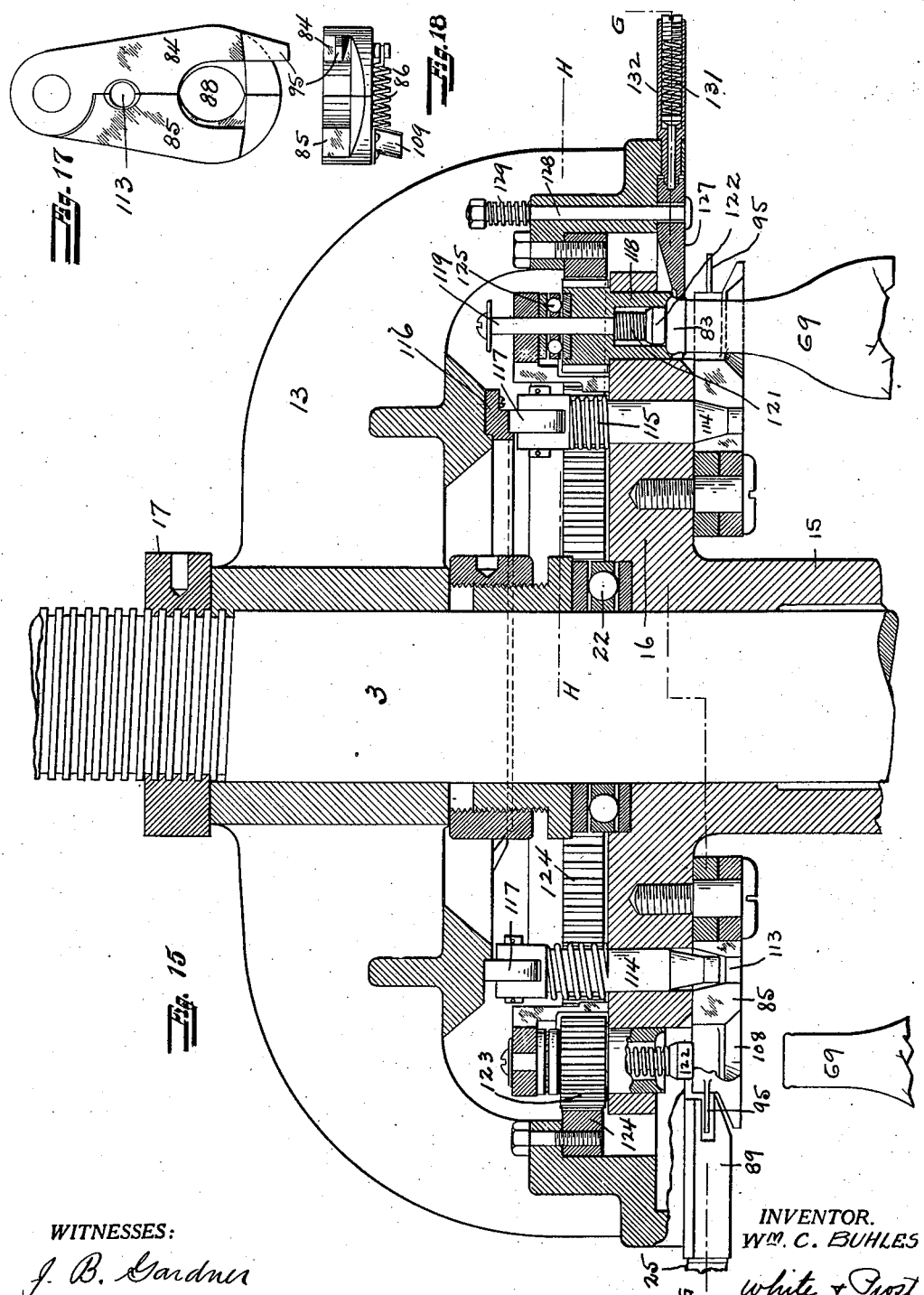
WITNESSES:
J. B. Gardner
M. Le Conte
INVENTOR.
Wm. C. BUHLES
White & Frost
his ATTORNEYS.

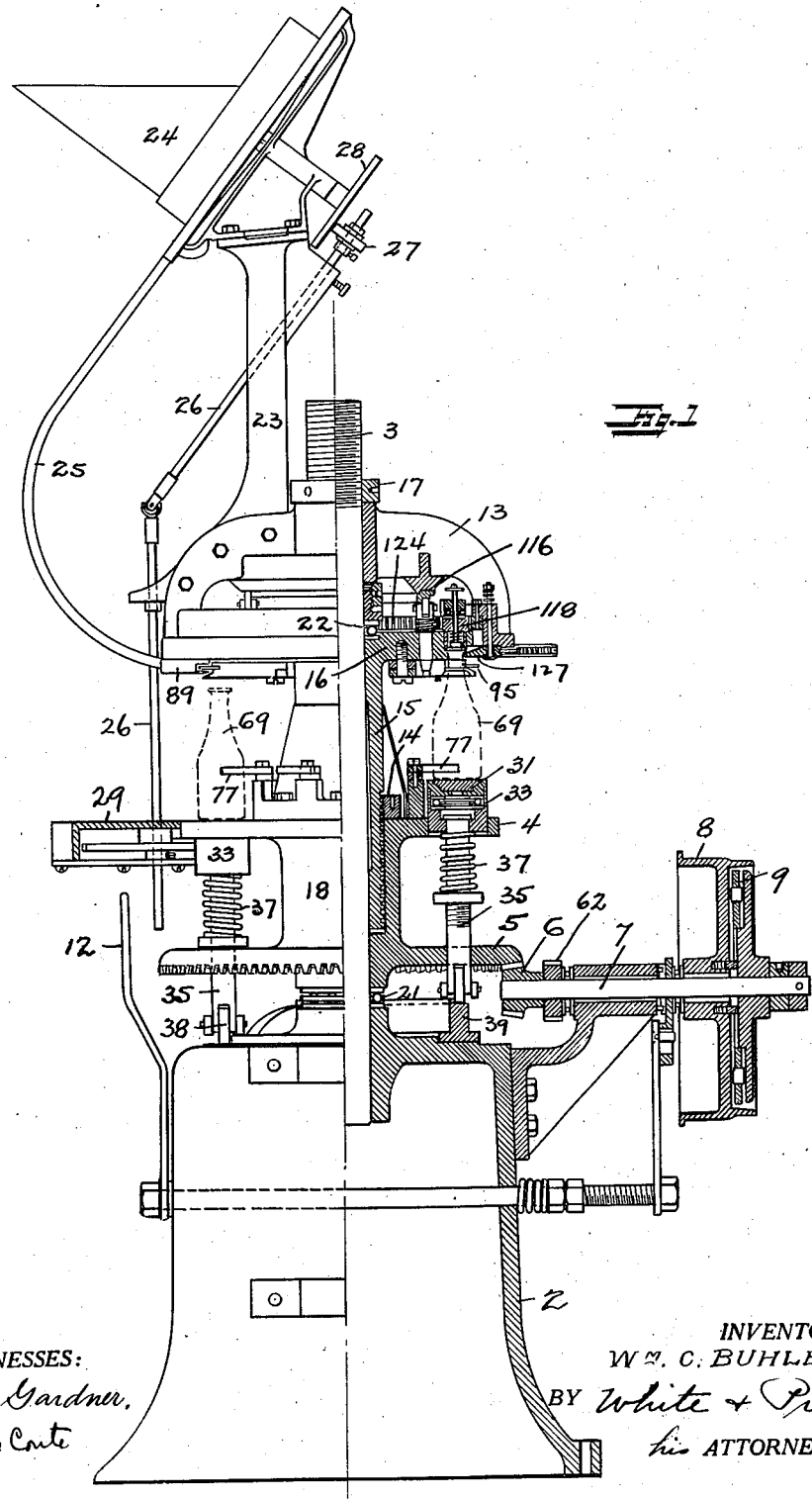

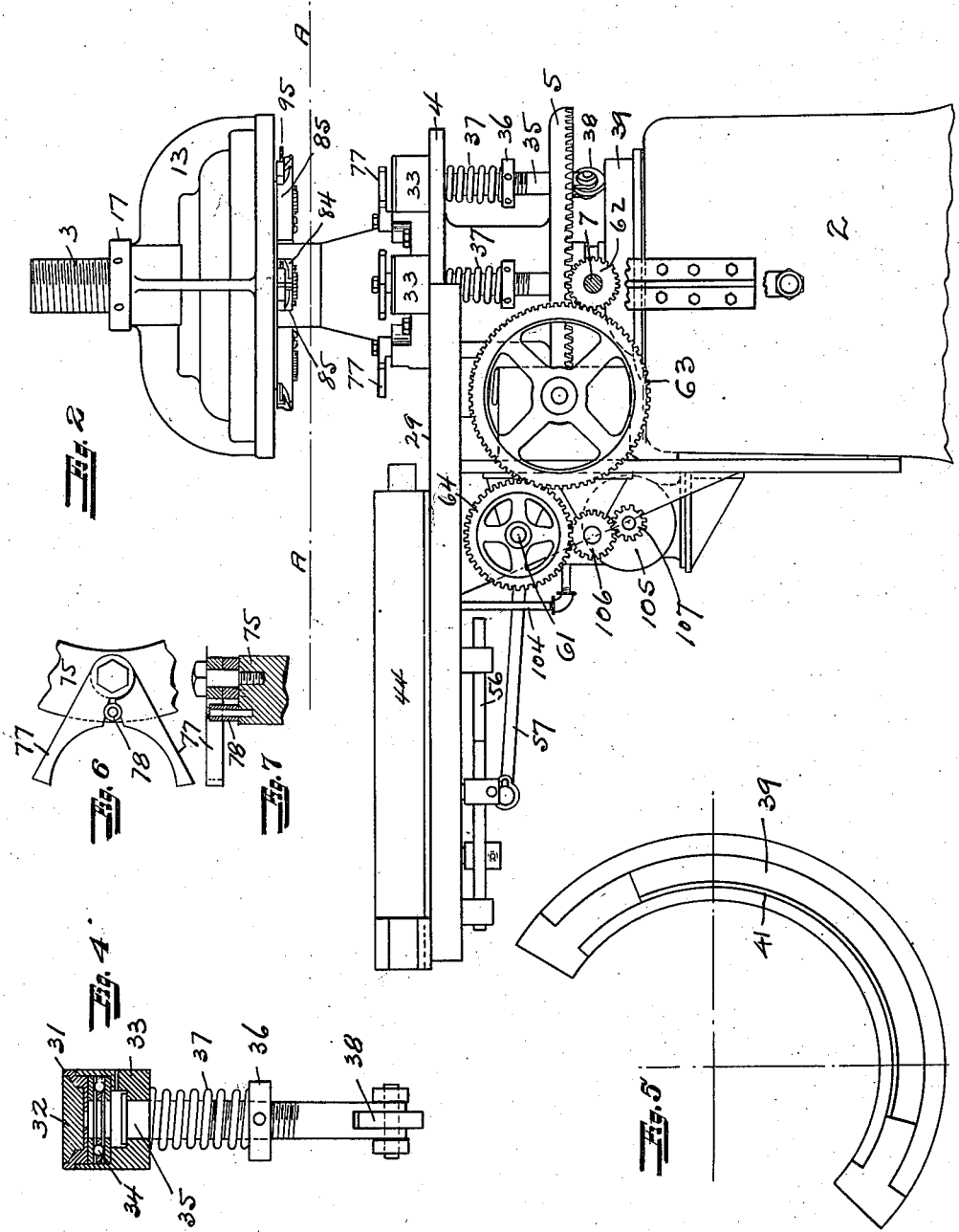

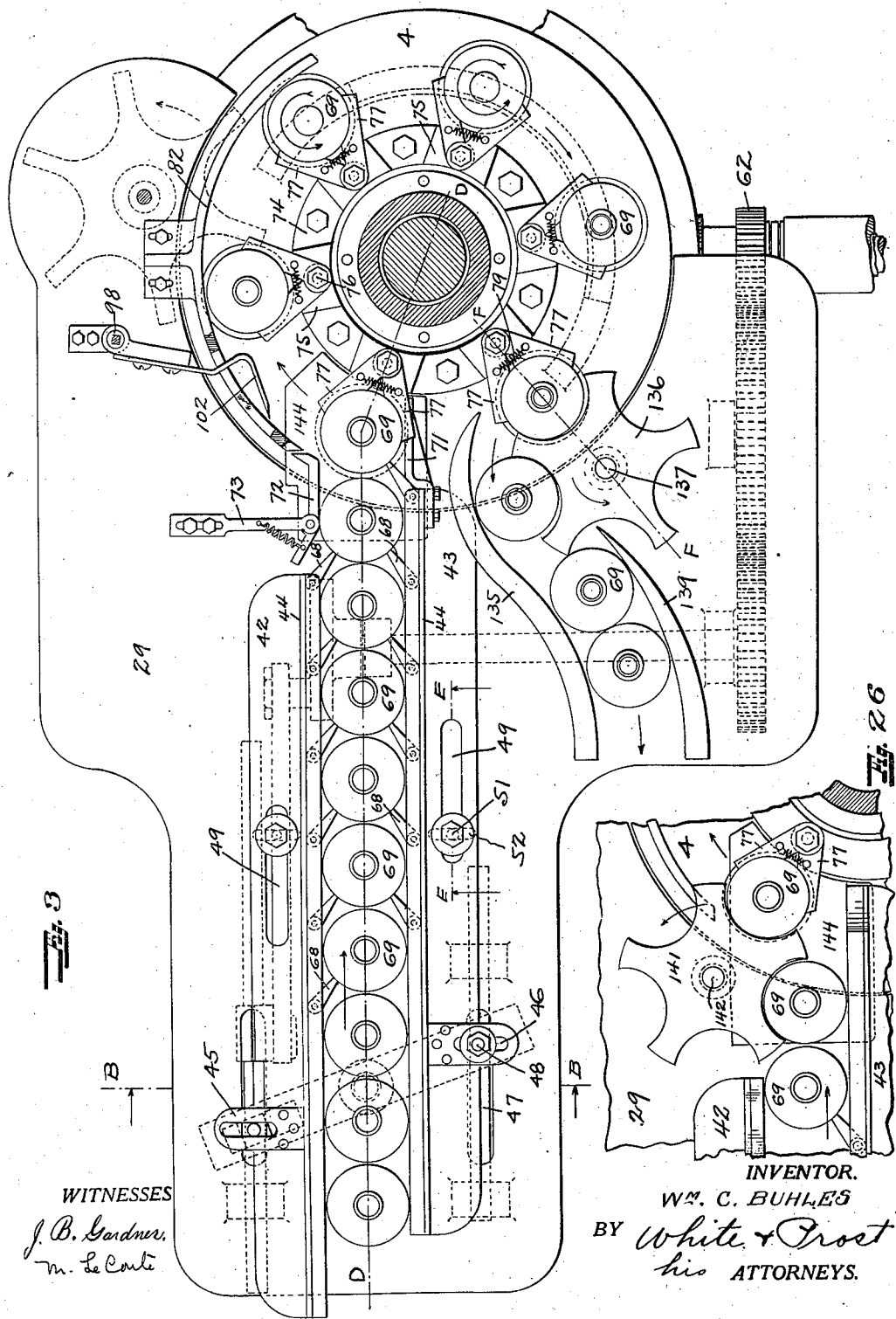

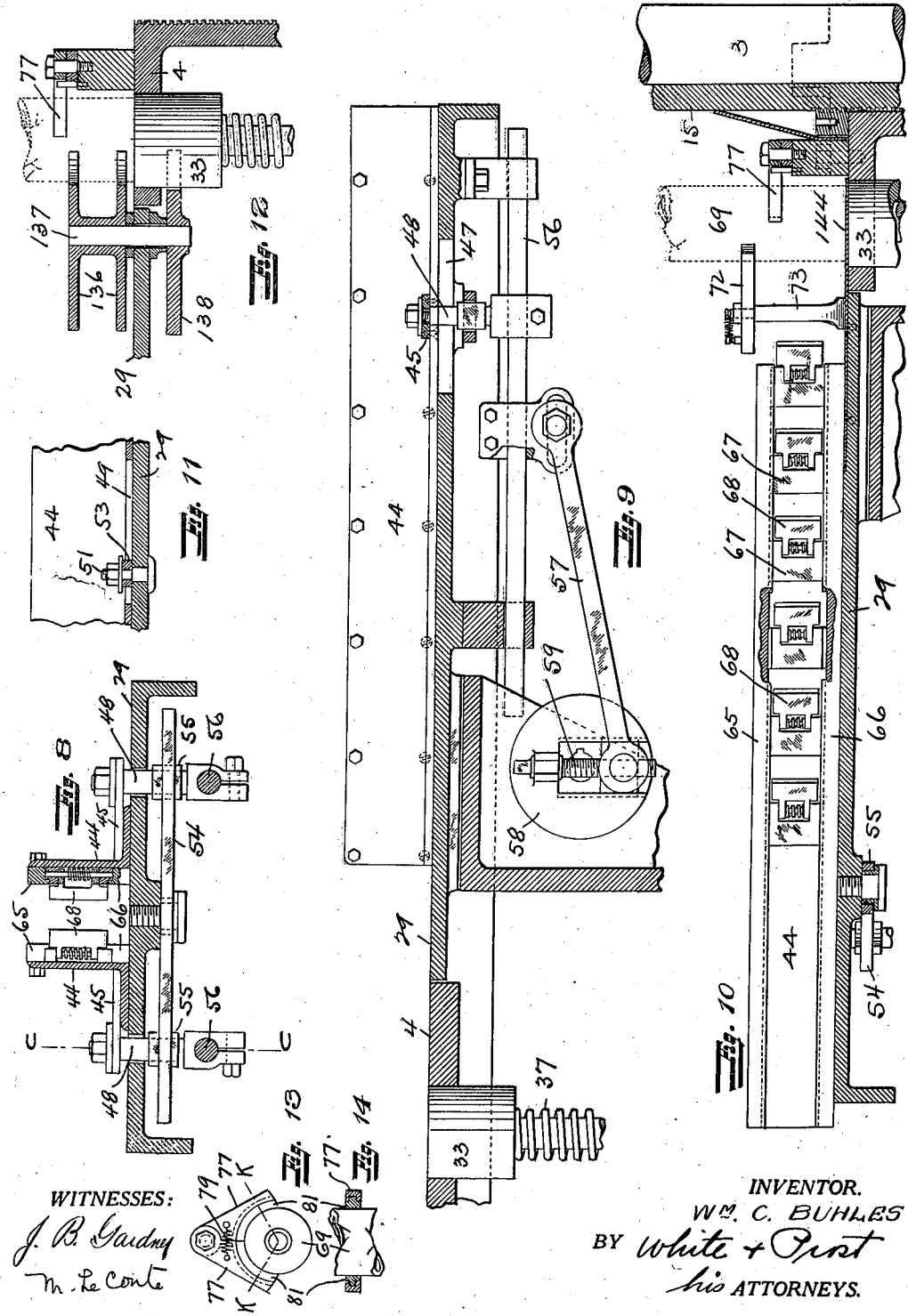

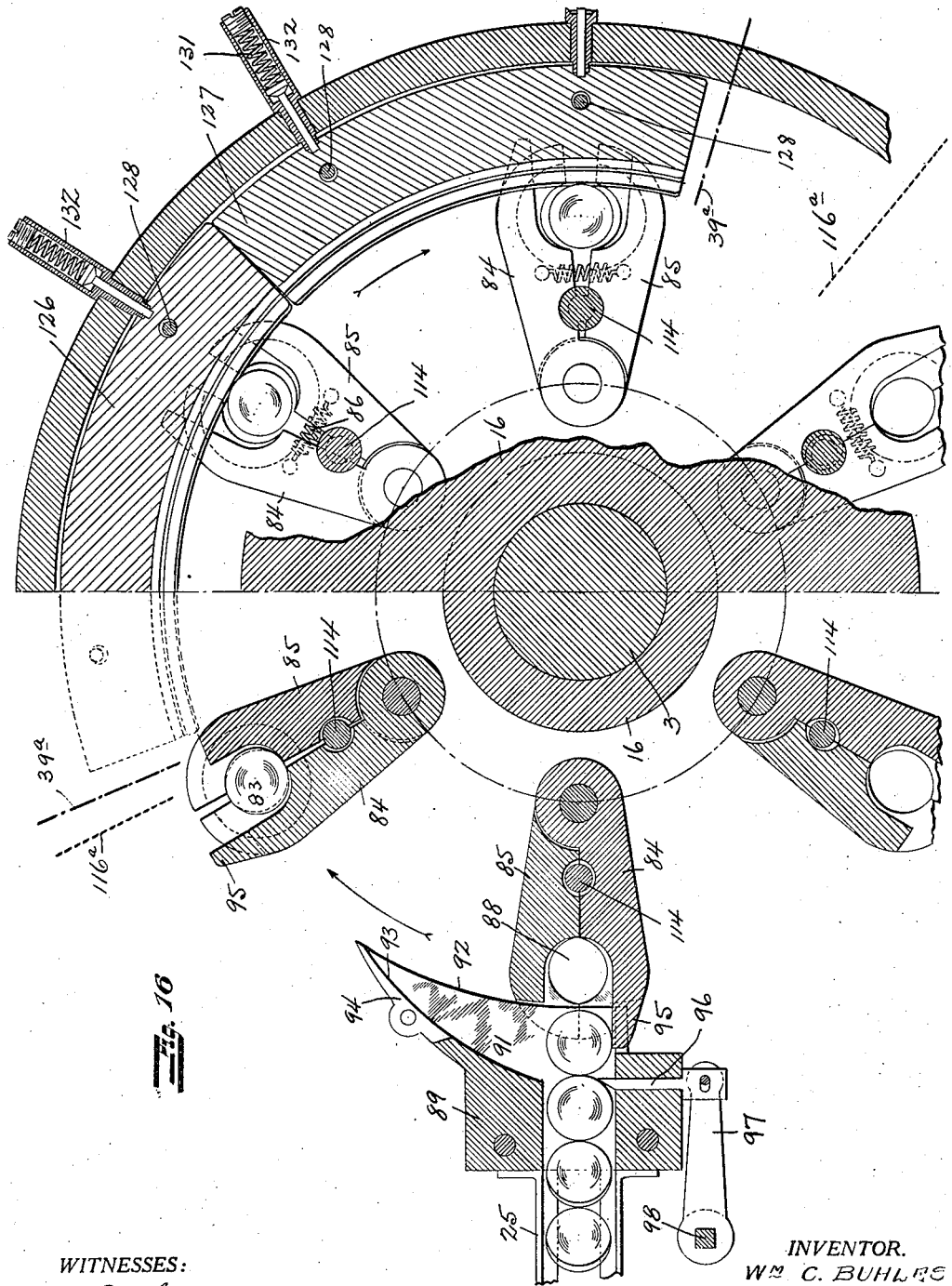

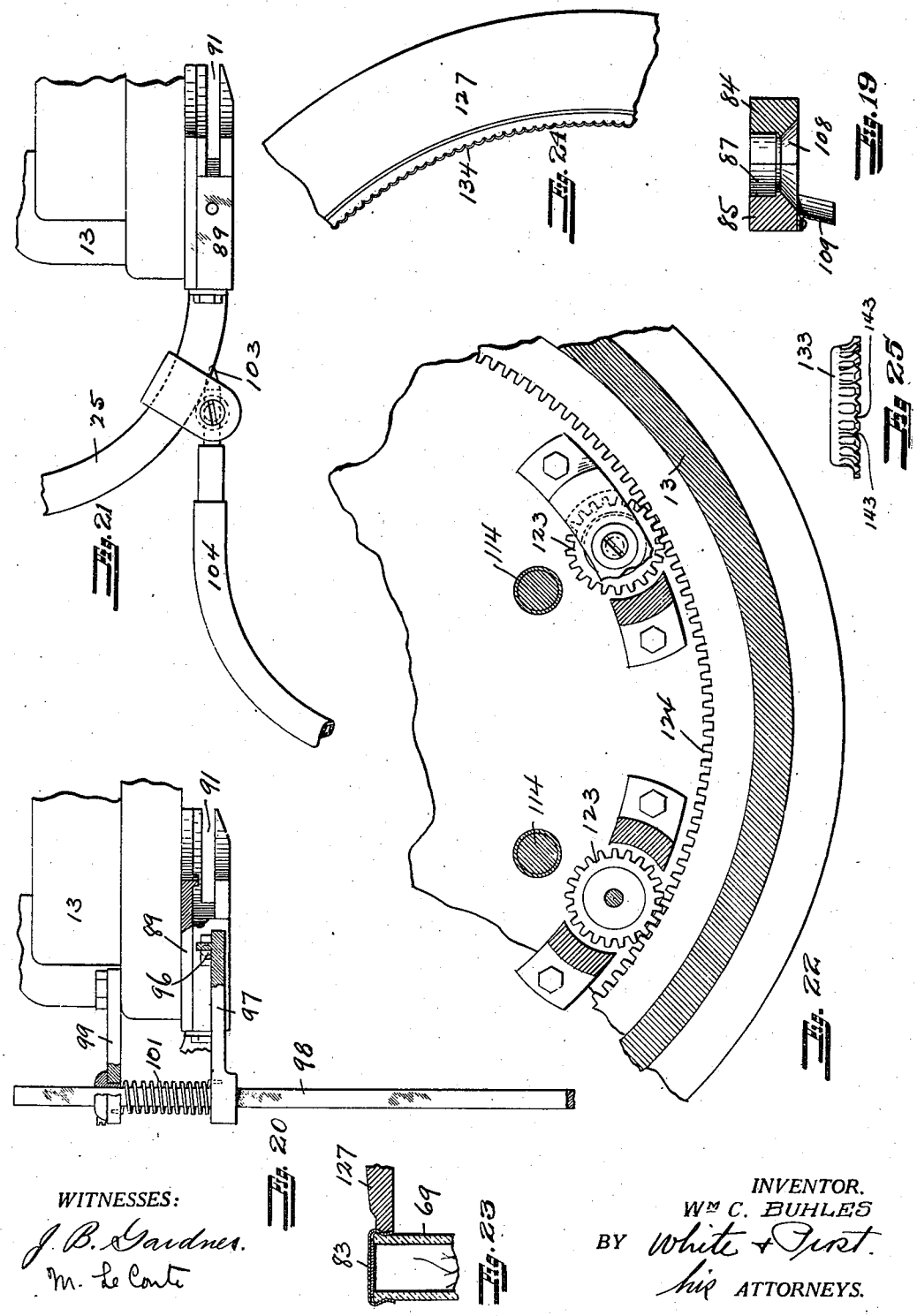

UNITED STATES PATENT OFFICE.

WILLIAM C. BUHLES, OF ALAMEDA, CALIFORNIA, ASSIGNOR TO ALUMINUM SEAL COMPANY, OF PITTSBURGH, PENNSYLVANIA, A CORPORATION OF PENNSYLVANIA.

CLOSING-MACHINE.

1,227,244.  Specification of Letters Patent.  Patented May 22, 1917.

Application filed March 10, 1915. Serial No. 13,368.

*To all whom it may concern:*

Be it known that I, WILLIAM C. BUHLES, a citizen of the United States, and a resident of Alameda, county of Alameda, and State of California, have invented a certain new and useful Closing-Machine, of which the following is a specification.

The invention relates to machines for closing receptacles by attaching or securing a cap or cover thereto.

An object of the invention is to provide a continuously operated automatic closing machine.

Another object of the invention is to provide new means for feeding the receptacles to the closing mechanism.

Another object of the invention is to provide new means for feeding the cap or cover to the receptacle.

A further object of the invention is to provide new means for securing the cap or cover to the receptacle.

The invention possesses many other objects and advantageous features, some of which, with the foregoing, will be set forth at length in the following description where I shall outline in full that form of the invention which I have selected for illustration in the drawings accompanying and forming part of the present specification. In the drawings I have shown only one specific form of my generic invention, but it is to be understood that I do not limit myself to such form because my invention may be embodied in a multiplicity of forms, each being a species of my said invention. It is also to be understood that by the claims succeeding the description of my invention I desire to cover the invention in whatever form it may be embodied.

The drawings show the invention embodied in a machine for attaching closures or caps to bottles and in the following description I shall refer to the specific construction shown but it is to be understood that the invention is not limited to a bottle closing machine, but may be embodied in machines for closing jars, cans and other receptacles. The invention includes coördinated mechanisms for feeding the receptacle, placing the closure thereon, sealing the closure to the receptacle and discharging the closed receptacle, the various mechanisms being interconnected and synchronized to perform the successive steps in the closing operation. The receptacles are continuously fed into the machine, the closures are fed from a magazine to the receptacles as the successive receptacles reach the closure receiving station and the closures are then sealed to the receptacles, the entire operation being continuous and automatic.

The accompanying drawings illustrate the invention as embodied in a bottle closing machine.

Figure 1 is a front elevation, half in section, of a bottle closing machine.

Fig. 2 is a side view of the machine, the closure feed hopper being omitted, part of the base being broken away and other parts being broken away to better disclose the construction.

Fig. 3 is a horizontal section of the machine taken on the line A—A Fig. 2, showing the feeding means and the means for advancing the bottle through the machine.

Fig. 4 is a vertical section of the plunger on which the bottle is advanced through the machine.

Fig. 5 is a plan view of the cam by which the plunger is moved vertically, the cam being positioned properly with respect to the machine as shown in Fig. 2.

Fig. 6 is a plan view of the guiding and centering arms which hold the bottle centrally on the plunger.

Fig. 7 is a vertical section through the guiding and centering means.

Fig. 8 is a vertical section of the bottle feeding means taken on the line B—B Fig. 3.

Fig. 9 is a vertical section of the bottle feeding means taken on the line C—C Fig. 8.

Fig. 10 is a vertical section of the bottle feeding means taken on the line D—D Fig. 3.

Fig. 11 is a vertical section of the bottle feeding means on the line E—E Fig. 3.

Fig. 12 is a vertical section of the bottle discharging means taken on the line F—F Fig. 3.

Fig. 13 is a plan view of a modified form of bottle guiding and centering means.

Fig. 14 is a section taken on the line K—K Fig. 13.

Fig. 15 is a vertical section of the head, showing the closure feed, the closure holders and their operating means and the means for sealing the closure to the receptacle.

Fig. 16 is a horizontal section of the head taken on the line G—G Fig. 15, showing the closure feed, the closure holders and bottle centerers and the sealing means.

Fig. 17 is a plan view of the closure holder and bottle centering means.

Fig. 18 is an end view of the closure holder.

Fig. 19 is a vertical section of the closure holder.

Fig. 20 is an elevation of the means for releasing the closure from the magazine or feed chute.

Fig. 21 is an elevation of the closure feed.

Fig. 22 is a horizontal section of the head taken on the line H—H Fig. 15.

Fig. 23 is a vertical section of bottle, closure and sealing tool.

Fig. 24 is a modified form of sealing tool which is used in connection with the style of closure shown in Fig. 25.

Fig. 26 is a fragmentary detail of the machine showing a modified form of receptacle feed.

The invention embodies receptacle feeding means, closure feeding means, closure placing means, means for sealing the closure to the receptacle and means for discharging the closed receptacles, together with mechanism for driving or operating all of said mechanisms so that the successive steps in the operation are performed successively and at the proper time.

The machine as a whole comprises a suitable base 2 to which is secured the vertical stationary spindle or axle 3. Surrounding the axle 3 is a rotatable table 4 upon which the bottles are carried through the machine. Formed integral with the table and arranged below the table is a spur gear 5 which meshes with a pinion 6 on the drive shaft 7. Loosely mounted on the drive shaft is a pulley 8 which is connected to the drive shaft by means of a clutch 9 which is operated by the handle 12. Movement of the handle in an arc serves to engage or disengage the clutch, to start or stop the machine.

Fixed to the axle 3 adjacent its upper end is a stationary frame or spider 13 which forms the stationary part of the head. Secured to the table 4 by means of the nut 14 is the shank 15 of the rotatable part 16 of the head, which rotatable part is arranged within the stationary part. The head, that is, the stationary and rotatable parts, is adjustable vertically so that the distance between the head and the table 4 may be varied to accommodate receptacles of different heights. The axle 3 is threaded at its upper end and the threaded portion is engaged by a nut 17 which is secured to the spider 13, and the shank 15 is threaded at its lower end and projects into the base 18 of the table 4, so that by rotating the nut 14, the rotatable part 16 of the head may be adjusted vertically. The table 4 and the rotatable head 16 are provided with suitable bearings 21—22 so that these parts may be readily rotated.

Mounted on the standard 23 which is secured to the head frame 13 is a hopper 24 for the closures, which contains a suitable selecting apparatus for selecting the closures and directing them into the closure chute 25 which is attached at its lower end to the frame 13. The closure selecting mechanism may be the same as that disclosed in my prior application for Letters Patent Serial Number 663,321, filed in the United States Patent Office on December 1, 1911. The selective mechanism is driven by the shaft 26 which is connected to a suitable rotating part of the machine. The mechanism is driven by the friction wheel 27 on the shaft 26 which engages the disk 28 secured to the shaft of the selecting mechanism. By varying the position of the wheel 27 with respect to the center of the disk 28 the speed of operation of the selecting mechanism may be varied.

Partly surrounding and substantially flush with the rotating table 4 is a stationary table 29, over which the receptacles are fed to the rotating table and onto which they are discharged from the rotating table. Means are provided for feeding the receptacles over the stationary table and onto the rotating table, said means being operated in time with the rotation of the rotating table, so that the receptacles are fed at the proper time and into their proper positions on the rotating table.

Arranged in the rotating table and normally flush with the surface thereof are a plurality of regularly spaced receptacle supporting elements preferably consisting of independently rotatable tables 31 and these elements will be termed turn-tables to differentiate them in the description from the rotatable table 4. The turn-tables 31, upon which the receptacles are placed by the feeding means, are preferably provided with a cover 32 of rubber or similar material upon which the receptacle or bottle rests. Each turn-table 31 is rotatably mounted on a plunger 33 by anti-friction bearings 34, so that the turn-table is readily rotatable. The plunger 33 is guided in the table 4 and is provided with a shank 35 to which it is loosely connected vertically. Secured to the shank 35 is a collar 36 and surrounding the shank and bearing against the collar and the plunger is a coiled spring 37, which resiliently holds the plunger up, so that it may be depressed when downward pressure is applied to the seat 31. The collar 36 is adjustable on the shank so that the compression of the spring 37 may be varied. The shank 35 extends through an aperture in the gear 5 and is provided on its lower end with a roller 38 which engages the circular cam 39 arranged on the base 2. The cam is provided with a shoulder 41 which prevents the shank 35 from rotating. As the table 4 rotates, the plungers 31 are raised and lowered, raising and lowering the bottles thereon and the cam is so disposed that the raising and lowering is synchronous with other correlated operations of the mechanism as will be hereinafter described.

I shall now describe the means whereby the receptacles are fed onto the receptacle supporting elements or turn-tables. Since the table 4 is rotated continuously and the receptacles must be fed onto the turn-tables, the feeding means must be so coördinated with respect to the table 4 that the receptacle is moved onto the table in time to be received by the turn-table. Arranged on the stationary table 29 are two parallel slides 42—43 formed of angle irons, one leg of the angle bearing on the table and the other standing perpendicularly thereto. The vertical legs 44 of the slides are spaced apart to permit the passage of a receptacle therebetween. The slides are reciprocated longitudinally in opposite directions and means are provided for causing the reciprocating motion of the slides to advance the receptacles to the turn-tables.

Secured to each slide is a tongue 45 having an elongated transverse slot 46 therein. The table 29 is provided with an elongated longitudinal slot 47 which occurs below the transverse slot and extending through both slots is a bolt 48. The slot 47 and the similar slots 49 in which the bolts 51 are arranged serve as guides to maintain the parallelism of the slides. Below the slots 49 are transverse slots 52 in the table through which the bolts 51 also pass and by virtue of the transverse slots 46 and 52, the slides may be adjusted transversely to vary the distance between them, so that they may be adjusted to handle receptacles of different sizes. The bolts 48 have different diameters at different points throughout their length so that they fit without material lost motion into the slots. The bolts 51 are provided with washers 53 which fit into the slots 49.

The slides are interconnected by the lever 54, centrally fulcrumed on the under side of the table. The lever is slotted at its opposite ends and engages collars 55 on the bolts 48, and as the lever is rocked on its fulcrum the slides are reciprocated in opposite directions. The bolts 48 are secured to the slide rods 56 which are journaled in bearings on the under side of the table. One of the slide rods 56 is adjustably connected by means of the connecting rod 57 with the drive wheel 58 so that the range of the stroke may be varied. The stroke of the slides may be varied when different size bottles are used, by varying the eccentricity of the connection between the drive wheel and the connecting rod, by rotating the screw 59. It has been shown that the distance between the slides may be varied, that the stroke of the slides may be varied and that the range of the stroke may be varied.

The drive wheel 58 is mounted on shaft 61 which is driven from the main shaft 7, through the gears 62—63 and 64 and these gears are so proportioned that a receptacle is fed onto the rotating table 4 as each turntable comes into position with respect to the feeding means.

Arranged on the inner sides of the vertical legs 44 of the slides 42—43 at the top and bottom are grooved bars 65—66 and seated in the grooves are a plurality of equally spaced blocks 67 which are clamped by the bars against the legs 44. Pivotally attached to each block is a spring pressed dog 68 which normally stands out into the passage way between the slides, but which may be readily pressed back to lie in the pocket formed between two adjacent blocks. The spacing of the dogs may be varied by loosening the bars 65 and 66 and shifting the blocks 67 when the feed is to be adjusted for different sizes of receptacles. The dogs are spaced apart on each slide a distance equal to the diameter of the receptacle, so that when the passage is full of bottles 69 each dog engages one bottle. As one slide is moved forward, the dogs on such slide engage the bottles and advance them a distance equal to the diameter of a bottle (the stroke of the slide being equal to the diameter of the bottle) and on its rearward movement, the dogs are pressed into their pockets. Since the two slides reciprocate in opposite directions and since both slides are provided with dogs, the bottles are continuously fed to the rotating table 4. Since the feed operating means and the table rotating means are interconnected, they operate in synchronism and a turn-table 31 is always in position to receive the bottle delivered by the feed.

Means are also provided for insuring the proper delivery of the bottle from the feeding means onto the turn-table. Secured to the end of the slide 43 is a finger 71 which forms a narrow extension alined with the slide which insures the bottle against displacement in its direction. At the other side of the passage and alined with the slide 42 is a pivoted spring pressed guide 72 which prevents displacement of the bottle in its direction. The guide 72 is pivoted to the bracket 73 which is adjustably secured to the table, so that it may be moved when the slide is adjusted laterally, to preserve its alinement with the slide.

Means are also provided for centraling the bottle on the turn-table. Secured to the rotating table 4 and arranged concentrically with respect to the circle passing through the centers of the turn-tables is a ring 74 provided with as many upstanding bosses 75 as there are turn-tables, each boss being radially alined with the turn-table. Pivoted to each boss by a common screw 76 are two fingers 77, the inner faces of which are curved on substantially the curvature of the bottle and the center of such curvature is coincident with the center of the turn-table. The two fingers are maintained in a spread position and are held from free rotation about their pivot by a pin 78 which seats in the boss 75 and is disposed between the two fingers. The fingers are normally prevented from spreading by the spring 79 which is attached at its ends to the fingers. Secured to the table 29 and flush with the surface thereof, is a sheet metal plate 144, which overlies that portion of the rotating table 4 which lies adjacent the ends of the feed slides. The bottles are moved by the slides onto the overlying plate and into engagement with the fingers 77 and each bottle is moved by the fingers off of the plate 144 and onto the turn-table. When a bottle of a different diameter is to be operated on, the minimum spread of the fingers is varied accordingly by using a pin 78 of different diameter. Another method of adjusting the fingers to accommodate bottles of different diameter is shown in Figs. 13 and 14. In this construction a curved filler piece 81 is secured to each finger, the inner curvature of the filler corresponding to the curvature of the bottle 69. During the first part of their travel on the rotating table 4, the bottles are held upright and on the turn-tables by the curved guide 82 which overlies the table 4 and which is adjustably attached to the table 29 so that its position may be adjusted to accommodate bottles of various diameters.

Means are provided for placing a closure or cap 83 in position to engage the mouth of the bottle as the bottle is carried around on the table 4. Pivotally connected to the under side of the rotating head 16 and in vertical alinement with each turn-table 31 are a pair of radially disposed jaws 84—85 which are normally held pressed together by a spring 86. The two jaws combine to form a pocket 87 which opens radially outward and which is slightly larger in diameter than the diameter of the cap 83. The pocket is provided with an opening 88 in the bottom, which when the jaws are closed together is of lesser diameter than the cap, so that a cap placed in the pocket when the jaws are closed will remain in the pocket. The cap is inserted in the pocket as the jaws rotate about the main vertical axis of the machine by virtue of such movement.

Attached to the stationary head frame 13 in a vertical plane slightly removed from the vertical plane of the bottle feed in the direction of rotation of the table 4 is the cap feed head 89 to which the cap chute 25 is connected. The feed head 89 is provided with a transverse horizontal passage or groove 91 into which the caps are singly fed from the cap chute. The front edge 92 of the feed head is concentric with the table 4 and the rear wall 93 of the passage 91 is eccentric to the axis of the table and curves inwardly in the direction of rotation of the table 4. The passage 91 is open at its leading end and the rear wall 93 is provided with a slot 94, so that a clear passage is formed through the head for the passage of an element moving concentrically of the table 4. The leading jaw 85 of the cap holding means is cut away at the outer end so that the jaw 85 does not engage the head 89 and the rear jaw 84 is provided with a finger 95 which moves through the passage 91. As the table 4 rotates the finger 95 enters the passage 91 and pushes the leading cap 83 along the passage 91 and since the rear wall 93 of the passage is eccentric to the center of rotation of the jaws, the cap is pushed inward by the rear wall 93 into the pocket 87 formed by the two jaws, and in this position rests directly over the mouth of the bottle on the turn-table below. The center of the pocket is vertically alined with the center of the turn-table.

Means are provided for assisting the feed of the caps to the passage 91 and also for allowing a cap to enter the passage only when a bottle is on the approaching turn-table. By this latter means, the cap is fed only when there is a bottle present to receive it, thereby obviating any waste of caps. Extending through the wall of the head 89 at a point adjacent the passage 91 is a slidable pin 96 which normally lies in the path of the caps descending in the chute and prevents the leading cap from entering the passage 91. The pin 96 is operated by the lever 97 secured to the shaft 98. The shaft 98 is supported by the bracket 99 attached to the head 89 and by the table 29. A spring 101 surrounding the shaft 98 and secured to the bracket 99 and the lever 97 holds the pin 96 normally in the path of the caps. Secured to the shaft 98 adjacent its lower end is a bent finger 102 which extends through a slot in the guide 82 over the rotating table 4 and into the path of the bottles carried thereon. As a bottle on the table 4 is moved past the finger 102 it pushes the finger out, thereby withdrawing the pin 96 and allowing one cap 83 to move into the passage 91. The finger 102 is arranged in advance of the cap feed head, so that the cap is released before the cap holding jaws reach the feed head. The caps are moved forward by gravity, but in order to insure their movement I provide means for directing a blast of air against the lower caps. The air nozzle 103 is arranged adjacent the lower end of the cap chute and air is supplied thereto through the conduit 104 which is connected to the blower 105 arranged on the base 2 and driven from gear 64 through the medium of gears 106 and 107.

Means are provided for releasing the cap from the jaws 84—85, placing the cap on the bottle and securing the cap to the bottle. The jaws 84—85 are provided along their meeting edges with an aperture 113, which when the edges of the jaws are together has the approximate shape of an ellipse. Disposed in this aperture is a round pin 114, which when depressed forces the jaws apart and thereby releases the cap. The pin 114 is vertically slidable in the rotating head 16 and is normally held in its raised position by the spring 115. The pin is depressed by means of a cam 116, secured to the fixed head 13, which cam is engaged by the roller 117 on the upper end of the pin. The cam 116 is so placed with relation to cam 39 that the jaws are spread and the cap is released as the neck of the bottle is pushed up between the jaws. The jaws are provided on their under sides below the pocket 87 with a flaring mouth 108, which serves to guide the neck of the bottle upwardly through the pocket. The flaring mouth is advisable on account of the slight irregularities of shape of many bottles. A skirt 109 may also be attached to the under side of jaw 85 to assist in directing the neck of the bottle into the pocket.

I have stated heretofore that as the table 4 is rotated, the plunger 33 is reciprocated vertically at the proper time. The upward movement of the plunger moves the neck of the bottle upward into engagement with the cap and moves the cap into engagement with the cap securing means. The location of the cams 39 and 116 is indicated in Fig. 16 in which the dotted lines 116ª indicate the ends of the cap releasing cam 106 and the dot and dash lines 39ª indicate the ends of the plunger reciprocating cam 39. The cams are so arranged that the jaws 84—85 are spread to release the cap, just as the bottle is raised into position to engage the cap. The jaws are then separated further so that they do not contact with the neck of the bottle and the bottle is raised further and brought into contact with means for pressing the cap down firmly on the mouth of the bottle.

Arranged above the center line of the jaws and vertically alined with and concentric with the turn-table 31 is a rotatable member 118 which is journaled in the rotatable head 16. The member 118 is provided with a hollow shank which is cupped on its lower end to receive the cap 83 on the bottle and against which the cap is pressed as the bottle reaches its highest position. Passing vertically through the member 118 is a plunger 119 which is normally depressed by the spring 121. The head 122 of the plunger normally projects below the lower edge of the member 118 and as the bottle is raised, the plunger engages the top of the cap and presses it firmly onto the bottle before the cap seats in the member 118. When the plunger is pressed into its upper position by the cap, the spring 121 and the head 122 are disposed within the hollow shank of the member.

Preferably formed integral with the member 118 is a pinion 123 which engages an internal gear 124 on the stationary head 13. As the frame 16 rotates with relation to the frame 13, the pinion and the member 118 are constantly rotating. The member is provided with an upper thrust bearing 125 which sustains the upward pressure of the bottle. Since the member 118 is constantly rotating during the operation of the machine and since the bottle stands on a freely rotatable turn-table, it is apparent that when the bottle is moved into engagement with the member 118, that it immediately rotates. The bottle is rotated so that the flange or skirt on the cap may be readily moved into locked engagement with the neck of the bottle. After the bottle is raised, therefore, it has a double rotary motion, one motion being the rotation of the bottle about its own axis and the other motion being the rotation of the bottle about the main axis of the machine.

The means for pressing the flange of the cap into engagement with the bottle neck consists of one or more knives or tools 126—127 which are attached to the inner side of the stationary frame 13 in such position that they contact with the rotating cap as the bottle is moved about the axis of the machine. The tools are formed of gradually increasing width or the working edges of the tools are eccentric to the axis of the machine, so that as the bottle cap is rolled along the edge of the tool, the flange on the cap is gradually pressed into tight engagement with the neck of the bottle. The tools 126—127 are secured to the frame 13 by bolts 128 which are yieldingly pressed upward by the springs 129 so the tools may adjust themselves vertically to accommodate slightly irregular bottles. The apertures in the tools through which the bolts 128 pass are larger than the diameter of the bolts so that the tools are capable of limited radial motion. The tools are pressed inward radially by the springs 131, arranged in barrels 132 secured to the frame 13, so that the tools may yield outwardly as the bottle cap is rolled thereover. This yielding mounting of the tools prevents an excessive pressure from being applied to the neck of the bottle. The machine can be employed for attaching caps having plain skirts as shown in Fig. 23, or caps 133 having fluted skirts as shown in Fig. 25. When caps 133 are employed, the tool may be formed with a correspondingly fluted edge 134 although such tool is not essential. When the tool having a fluted edge 134 is employed, the tool is so formed that it engages the fluted skirt between the ribs 143 and bends the outstanding portion of the skirt inward between the ribs. This action causes the ribs to be drawn together at their lower ends and bends the upright portion of the skirt inward, causing it to firmly grip the neck of the receptacle.

When the bottle has passed the end of the tool 127 and the cap has been securely attached, the plunger 33 is lowered to bring the turn-table 31 flush with the surface of table 4 removing the bottle from contact with the rotating member 118 and lowering it below the jaws 84—85, which are subsequently allowed to close by the upward movement of the pin 114. The sealed bottles are then removed from the table 4 onto the table 29 from which they are removed by hand or otherwise. Secured to the table 29 and partly overlying the table 4 and extending into the path of the bottles is a curved guide 135. As the bottles approach the guide 135 they are engaged by the double star wheel 136 which is secured to the vertical shaft 137 passing through the table 29. Secured to the shaft 137 below the table 29 is a star wheel 138, which is engaged and caused to rotate one step by the plunger 33 upon which the bottle is seated. The star wheels 136 acting in conjunction with the guide 135 remove the bottle from the rotating table 4. Arranged parallel to guide 135 is a guide 139 and the bottles are moved over the table 29 between these guides.

A modified form of receptacle feed is shown in Fig. 26. In this construction the receptacles are fed by the reciprocating slides 42—43 to the star wheel 141, which is arranged to receive the receptacle from the slides and deposit it upon the turn-table 31. The star wheel 141 is secured to the shaft 142 which extends vertically through the table 29, and secured to the shaft below the table is another star wheel which engages the plungers 33 of the rotating table, thereby causing rotation of the star wheel. The upper and lower star wheels register with each so that the receptacle is centrally placed on the turn-table. The arrangement of these star wheels is the same as that of the take-off star wheels shown in Fig. 12.

The operation of the machine is as follows:

Assuming the machine to be in operation, the table 4 rotating and the feed slides 42—43 reciprocating. A bottle 69 is placed between the feed slides in range of the dogs 68 and is advanced thereby to the rotating table 4 and seated centrally on the turn-table 31 of a plunger 33. The bottle is carried by the table into engagement with the finger 102 which operates to release a cap 83 in the feed head 89 and place it in the passage 91. The finger 95 on the jaw 84 disposed above the bottle slides the cap out of the passage and into the pocket 87 formed between the jaws. The further rotation of the table 4 causes the plunger on which the bottle is placed to be elevated moving the mouth of the bottle between the jaws 84—85 and into contact with the cap. The jaws are then separated to allow the free passage of the neck of the bottle between them and the plunger continues to raise the bottle, bringing the cap first into contact with the pressure member 122 and then into contact with the rotating member 118. The bottle is then immediately rotated by the rotating member and is carried along in contact with and rolled along the edges of the tools which press the flange of the cap into locking engagement with the bottle neck. The bottle is then lowered by the plunger from engagement with the rotating member and is engaged by the star wheel 136 and removed from the table 4.

I claim:

1. The combination with a movable rotatable element adapted to receive upright receptacles, of means for holding a closure, means operative by the presence of a receptacle on said element for placing a closure in said holding means, means for placing the closure on said receptacle, means for securing said closure to said receptacle, and means for rotating the closure in contact with said securing means.

2. The combination with a movable rotatable element adapted to receive an upright receptacle, of means for holding a closure, means operative by the presence of a receptacle on said element for placing a closure in said holding means, means for placing the closure on said receptacle, tools for securing the closure to the receptacle and means for rotating the receptacle and closure in contact with said tools.

3. The combination with a movable table, of a turn-table on said table adapted to receive an upright receptacle, closure feeding means, closure holding means on said table, means operative by the presence of a receptacle on said turn-table for feeding a closure to said holding means, means for placing the closure on said receptacle, and means for securing the closure to the receptacle.

4. The combination with a movable table adapted to receive upright receptacles, of means operative by the presence of a receptacle on said table and in time with the movement of said table for placing a closure in position above the receptacle, and means operative by and in time with the movement of said table for moving the receptacle into engagement with said closure and securing the closure to the receptacle.

5. The combination with a movable table, of an independently rotatable turn-table on said table adapted to receive a receptacle, a closure feed, means operative by the presence of a receptacle on said turn-table for feeding a closure into position above said receptacle, means for raising said receptacle into engagement with said closure, means for rotating said closure and receptacle, and means for securing the closure to the receptacle.

6. In a machine of the class described, a rotatable table, a turntable on said table adapted to receive a receptacle, and a pair of curved fingers pivoted to said table for centering the receptacle on said turntable.

7. In a machine of the class described, a rotatable table, a turn-table on said table adapted to receive a receptacle and means pivoted to said table for centering the receptacle on said turntable.

8. In a machine of the class described, a rotatable table, a turn-table on said table adapted to receive a receptacle, means for centering the receptacle on said turn-table pivotally mounted on the rotatable table and means for adjusting said centering means.

9. In a machine of the class described, a rotatable table, a turn-table on said table adapted to receive a receptacle and a pair of spring closed centering fingers arranged above said turn-table.

10. In a machine of the class described, a rotatable table, a turn-table on said table adapted to receive a receptacle, a pair of fingers having curved inner surfaces pivotally arranged above said turn-table and adapted to center the receptacle thereon, means for varying the minimum spread of said fingers, and means tending to pull the fingers together.

11. The combination with a receptacle closure feed head having a transverse groove therein, of means for delivering a closure to said groove and unitary means for removing the closure from said groove alining it with said receptacle and placing it on the receptacle.

12. The combination with a movable element adapted to receive and carry a receptacle, of a receptacle closure feed head having a transverse groove of gradually decreasing depth therein arranged above said element, and means connected to said element and arranged above the receptacle thereon adapted to travel longitudinally through said groove to remove the closure therefrom and position it above the receptacle.

13. The combination with a movable table adapted to receive and carry a receptacle, of a receptacle closure feed head arranged above said table and provided with a transverse groove, the rear wall of which lies in a curve intersecting the path of the receptacle, and means connected to said table adapted to enter said groove and extract the closure therefrom.

14. The combination with a rotatable table adapted to receive and carry a receptacle, of a receptacle closure feed head arranged above said table and provided with a transverse groove, the rear wall of the groove being eccentric to the center of rotation of the table and approaching the table in the direction of rotation, and means for moving a closure longitudinally in said groove.

15. A receptacle closure feed head having a connected transverse groove and longitudinal slot therein, said transverse groove being of gradually decreasing depth, means for controlling the movement of the closures from the longitudinal slot to the transverse groove, and means for removing the closures from the transverse groove.

16. The combination with a rotatable table adapted to receive and carry a receptacle, of a receptacle closure feed head arranged above said table and having a transverse groove therein, the rear wall of the groove being eccentric to the center of rotation of the table and approaching the table in the direction of rotation, and means attached to the table arranged to pass longitudinally through said groove and move the closure from the groove into position over the receptacle.

17. The combination with a rotatable table adapted to receive and carry a receptacle, of a receptacle closure feed head having a transverse closure receiving groove therein arranged above said table, the rear wall of the groove being eccentric to the center of rotation of the table, closure supporting means connected to the said table and a projection on said means adapted to pass through said groove longitudinally whereby the closure is moved from the groove onto the supporting means.

18. In a machine of the class described, a movable table adapted to receive and carry a receptacle, a movable head arranged above and connected to said table, receptacle closure placing means pivotally mounted on said head, and means for varying the distance between said head and table to accommodate receptacles of various heights.

19. In a machine of the class described, a movable table adapted to receive and carry a receptacle, a movable head arranged above and connected to said table, receptacle closure placing means pivotally mounted on said head, a fixed head arranged adjacent said movable head and means on said fixed head for securing the closure to the receptacle.

20. In a machine of the class described, a rotatable table adapted to receive and carry a receptacle, a rotatable head arranged above and secured to said table, means pivoted on said head for placing a closure on the receptacle, a fixed head surrounding said rotatable head, and means on said fixed head for securing the closure to the receptacle.

21. In a machine of the class described, a rotatable table adapted to receive and carry a receptacle, a rotatable head arranged above and secured to said table, a fixed head surrounding said rotatable head, a receptacle closure feed head attached to said fixed head, means on said rotatable head for removing a closure from said feed head and placing it on said receptacle, means for rotating the receptacle and closure about its axis, and means for securing the closure to the receptacle.

22. In a machine of the class described, a rotatable table adapted to receive and carry a receptacle, a rotatable head arranged above and secured to said table, a fixed head surrounding said rotatable head, means pivoted to said rotatable head for placing a closure on said receptacle, means on said rotatable head arranged to engage said closure on the receptacle, and means on the fixed head for securing the closure to the receptacle.

23. In a machine of the class described, a rotatable table, a turn-table arranged on said table adapted to receive and carry a receptacle, a rotatable head arranged above and secured to said rotatable table, means pivoted to said rotatable head for placing a closure on said receptacle and means rotated by the rotation of said head for rotating the receptacle about its own axis.

24. In a machine of the class described, a rotatable table, a turntable arranged on said table adapted to receive and carry a receptacle, a rotatable head arranged above and secured to said table, a rotatable element carried by said head, means pivoted to the rotatable head for placing a closure on the receptacle, and means for moving the receptacle into operative engagement with said rotatable element.

25. In a machine of the class described, a rotatable table, a turn-table arranged on said table adapted to receive and carry a receptacle, a rotatable head arranged above and secured to said table, a rotatable element carried by said head, means pivoted to said rotatable head for placing a closure on the receptacle, means for pressing the closure downward on said receptacle and means for moving the receptacle into operative engagement with said pressing means and rotatable element.

26. In a machine of the class described, a rotatable table, a turntable arranged on said table adapted to receive and carry a receptacle, a rotatable head arranged above and secured to said table, a rotatable element carried by said head, means pivoted to the rotatable head for placing a closure on the receptacle, means for moving the receptacle into operative engagement with said rotatable element, and means for securing the closure to the receptacle.

27. In a machine of the class described, a rotatable table, a turn-table on said table adapted to receive and carry a receptacle, a rotatable head arranged above and secured to said table, means pivoted to said rotatable head for placing a closure on the receptacle, a fixed head surrounding said rotatable head, a rotatable element on said rotatable head arranged in axial alinement with said turn-table, means operated by the movement of the rotatable head with respect to the fixed head for rotating said element, means operative by the rotation of the table for moving the receptacle and closure into engagement with said rotatable element and means on the fixed head for securing the closure to the receptacle.

28. The combination with a pair of pivoted jaws adapted to receive a receptacle closure, of means for placing a closure on said jaws and means operative during the presence of the closure on the jaws for opening said jaws to release the closure.

29. The combination with a pair of pivoted jaws having an open bottom pocket formed on their upper surfaces, of means for placing a receptacle closure in said pocket and means operative during the presence of the closure on the jaws for opening the jaws to release the closure.

30. The combination with a pair of jaws pivoted on a vertical axis and having a pocket formed in their upper surfaces adapted to receive a receptacle closure, of means for normally holding said jaws together and means operative during the presence of the closure on the jaws for opening said jaws to release the closure.

31. The combination with a table adapted to support a receptacle, of a pair of closure holding jaws arranged above the table, means for separating the jaws to release the closure and means for simultaneously moving the receptacle into contact with the closure.

32. The combination with a table adapted to support a receptacle, of a pair of jaws arranged above the table with the center line of the jaws intersecting the extended axis of the table, means for placing a closure on said jaws, means for separating the jaws to release the closure, and means for simultaneously moving the receptacle into contact with the closure.

33. In a machine of the class described, a movable table adapted to support a receptacle, a pair of jaws arranged above and connected to said table, said jaws being provided with a pocket adapted to hold a closure for the receptacle, and means operative by the movement of the table during the presence of the closure on the jaws for opening said jaws to release the closure.

34. In a machine of the class described, a movable table adapted to support a receptacle, a pair of jaws arranged above and connected to said table, said jaws being provided with a pocket adapted to contain a closure, means operative by the movement of the table for opening said jaws to release the closure, and means operative by the movement of the table for simultaneously raising the receptacle into contact with the closure.

35. In a machine of the class described, a rotatable table adapted to support a receptacle, a pair of jaws arranged above and movable with the table, said jaws being provided with an open bottom pocket at their meeting edges adapted to contain a closure for the receptacle, said pocket being arranged directly above the receptacle, means for normally holding the jaws together, a pin disposed between said jaws, means for moving said pin to open said jaws and release the closure and means for simultaneously raising the receptacle into contact with the closure.

36. In a machine of the class described, a rotatable table adapted to support a receptacle, a pair of jaws arranged above and connected to the table, said jaws being provided at their meeting edges on the upper face with a pocket and on the lower face with a flaring mouth registering with and opening into the pocket, means for placing a closure in the pocket, means operative by the rotation of the table while the closure is in said pocket for opening said jaws to release the closure, and means operative by the rotation of the table for moving the neck of the receptacle through said mouth and pocket into contact with the released closure.

37. The combination with a rotatable table, of turn-tables arranged in said table, a stationary table, means for moving receptacles over said stationary table to said rotatable table, a plate flush with said stationary table and overlying said rotatable table onto which the receptacles are fed, and means on the rotating table adapted to remove a receptacle from said plate and place it on a turn-table.

38. The combination with a movable receptacle supporting structure, of a stationary receptacle holding plate arranged above said structure and means connected to the structure arranged to remove the receptacle from said plate and place it on said structure.

39. The combination with a movable structure adapted to receive and carry a receptacle, of means for placing a closure on said receptacle, a tool for securing said closure to said receptacle, and means for rotating said receptacle and closure in contact with said tool, said tool being spring held against movement in a direction parallel to the axis of rotation of said receptacle and spring pressed in a direction at right angles thereto.

In testimony whereof, I have hereunto set my hand at San Francisco, California, this 4th day of March 1915.

WILLIAM C. BUHLES.

In presence of—
H. G. PROST,
J. B. GARDNER.